United States Patent
Grossman et al.

(10) Patent No.: US 12,360,224 B1
(45) Date of Patent: Jul. 15, 2025

(54) LAMINATE STRUCTURES FOR MAINTAINING CLEAR APERTURES

(71) Applicant: Waymo LLC, Mountain View, CA (US)

(72) Inventors: William Grossman, East Palo Alto, CA (US); Troy Scott Storz, Manteca, CA (US); Matthew Carroll, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/365,669

(22) Filed: Aug. 4, 2023

Related U.S. Application Data

(63) Continuation of application No. 16/593,531, filed on Oct. 4, 2019, now Pat. No. 11,852,753.

(51) Int. Cl.
*G01S 7/497* (2006.01)
*G01S 7/481* (2006.01)

(52) U.S. Cl.
CPC ............ *G01S 7/497* (2013.01); *G01S 7/4813* (2013.01); *G01S 2007/4977* (2013.01)

(58) Field of Classification Search
CPC . G01S 7/497; G01S 7/4813; G01S 2007/4977
See application file for complete search history.

(56) References Cited

U.S. PATENT DOCUMENTS

| | | | |
|---|---|---|---|
| 6,870,686 B2 | 3/2005 | Wilson et al. | |
| 9,674,409 B2 | 6/2017 | Jones | |
| 11,852,753 B1 | 12/2023 | Grossman et al. | |
| 2015/0145990 A1* | 5/2015 | Jones | H04N 23/51 348/143 |
| 2017/0108428 A1* | 4/2017 | Rowe | G01N 15/0227 |
| 2017/0313288 A1 | 11/2017 | Tippy et al. | |
| 2019/0075225 A1 | 3/2019 | Maggard et al. | |
| 2019/0158765 A1 | 5/2019 | Kuybeda et al. | |
| 2022/0113427 A1* | 4/2022 | Watano | G01S 7/4814 |

FOREIGN PATENT DOCUMENTS

WO 2012074731 A1 6/2012

* cited by examiner

*Primary Examiner* — Girumsew Wendmagegn
(74) *Attorney, Agent, or Firm* — MCDONNELL BOEHNEN HULBERT & BERGHOFF LLP

(57) ABSTRACT

A sensor (e.g., an optical sensor) is disposed in an enclosure that separates it from an external environment. The enclosure includes an aperture comprising a transparent material. A laminate comprising a plurality of transparent films is coupled to the aperture such that the sensor has a field of view of the external environment through the transparent material of the aperture and the plurality of transparent films. The laminate includes an exposed transparent film that is exposed to the external environment and that is removable to expose an underlying film in the laminate when dirt, debris, or other obscuring material has collected on it. A laminate module that includes the laminate, a laminate sensor, and a peeling mechanism may be removably mounted on the aperture. The laminate sensor can sense the number of transparent films remaining in the laminate. The peeling mechanism can peel away individual transparent films in the laminate.

20 Claims, 11 Drawing Sheets

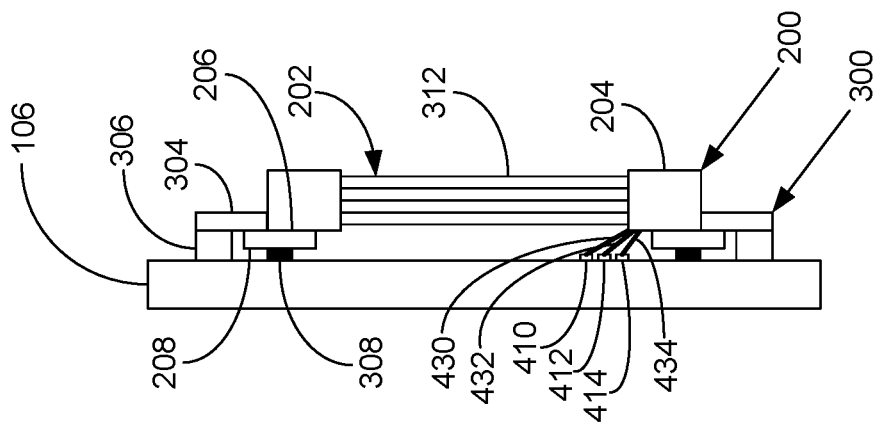
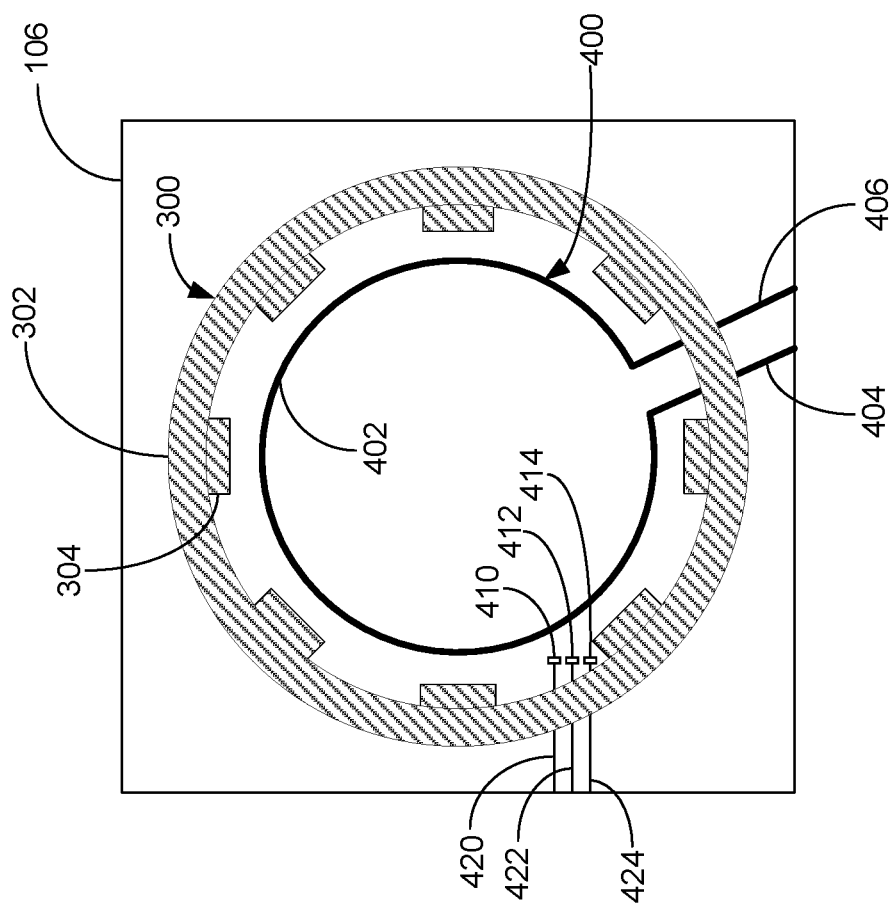
FIG. 4B
FIG. 4A

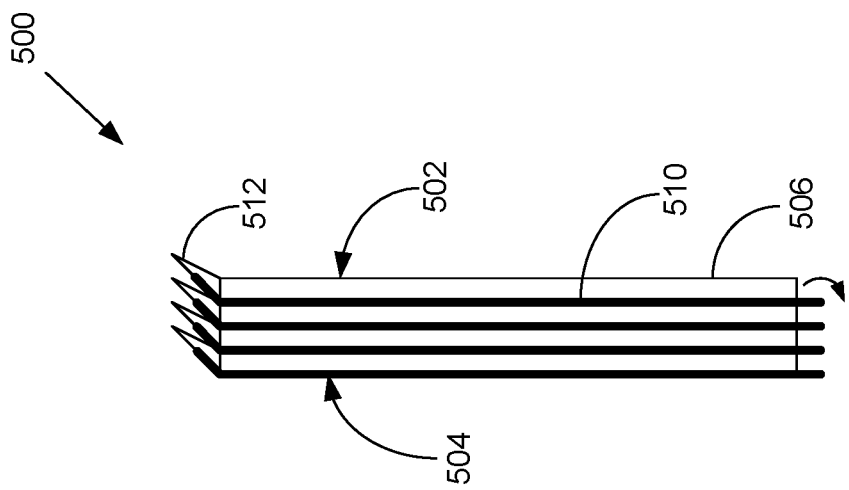
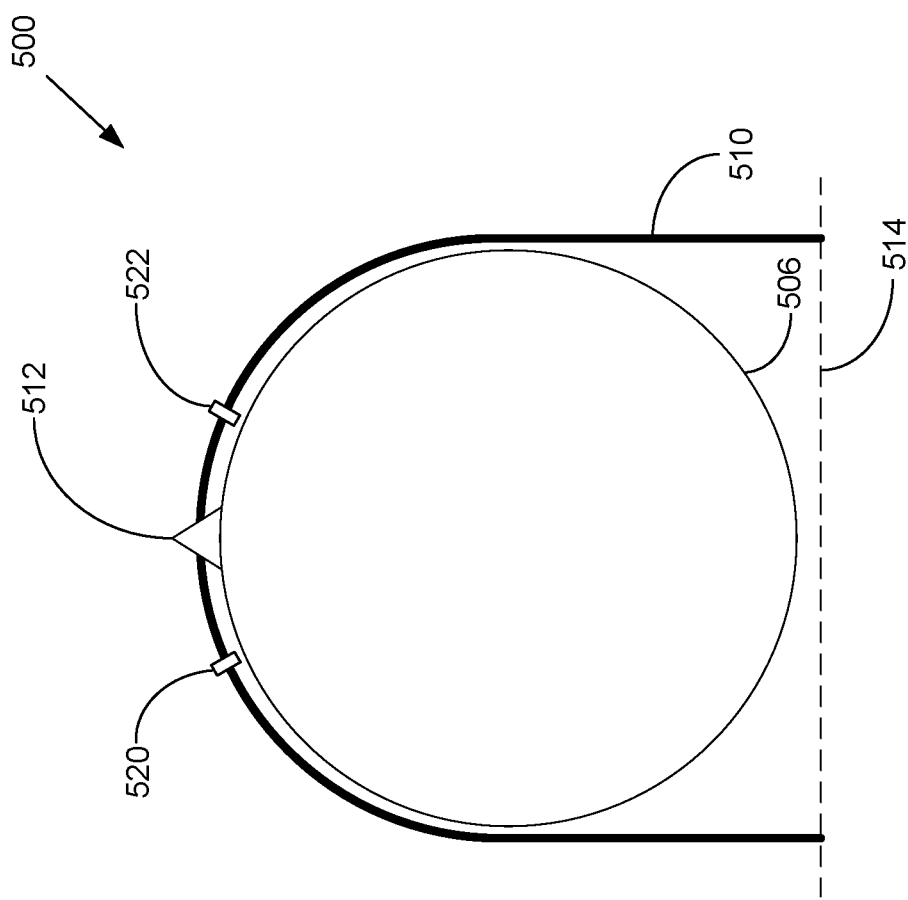

LAMINATE STRUCTURES FOR MAINTAINING CLEAR APERTURES

CROSS-REFERENCE TO RELATED APPLICATIONS

This application is a continuation of U.S. patent application Ser. No. 16/593,531, filed Oct. 4, 2019, which is incorporated herein by reference.

BACKGROUND

An optical sensor, such as a camera or a light detection and ranging (LIDAR) device, may be configured to detect light (e.g., visible light or infrared light) that is received from an external environment through a transparent aperture within a field of view of the optical sensor. For example, a camera may capture still or video images, whereas a LIDAR device may obtain point cloud data. When the optical sensor is exposed to the external environment over time, such as in implementations in which the optical sensor is mounted on a vehicle (e.g., an autonomous vehicle), the transparent aperture can become contaminated by dirt, debris, or other obscuring material from the external environment. The presence of such obscuring material in the optical sensor's field of view can degrade the performance of the optical sensor and may, in some cases, render the optical sensor unable to obtain useful images, point cloud data, or other sensor data.

SUMMARY

The present disclosure generally relates to maintaining a clear aperture for a sensor (e.g., a camera or LIDAR device) by protecting the aperture with a laminate that comprises a plurality of transparent films. The laminate includes an exposed transparent film that is exposed to the environment. When the exposed transparent film becomes obscured by dirt, debris, or other obscuring material, the exposed transparent film can be removed to expose an underlying transparent film in the laminate.

In a first aspect, an apparatus is provided. The apparatus comprises a sensor, an enclosure that separates the sensor from an external environment, and a laminate comprising a plurality of transparent films. The enclosure includes an aperture comprising a transparent material. The laminate is coupled to the aperture such that the sensor has a field of view of the external environment through the transparent material of the aperture and the plurality of transparent films. The plurality of transparent films includes an exposed transparent film that is exposed to the external environment. The exposed transparent film is removable to expose an underlying transparent film in the laminate.

In a second aspect, a system is provided. The system comprises a sensor, a laminate comprising a plurality of transparent films, a peeling mechanism, and a controller. The laminate is positioned such that the sensor has a field of view of an external environment through the plurality of transparent films. The plurality of transparent films includes an exposed transparent film that is exposed to the external environment. The peeling mechanism is configured to peel away individual transparent films from the laminate. The controller is configured to cause the peeling mechanism to peel away the exposed transparent film in response to a predefined trigger that indicates a presence of obscuring material on the exposed transparent film.

In a third aspect, a method is provided. The method involves sensing, by a controller, a laminate comprising a plurality of transparent films. The laminate is positioned such that a sensor has a field of view of an external environment through the plurality of transparent films. The plurality of transparent films includes an exposed transparent film that is exposed to the external environment. The method further involves detecting, by the controller, a predefined trigger that indicates a presence of obscuring material on the exposed transparent film and, in response to the predefined trigger, causing, by the controller, a peeling mechanism to peel away the exposed transparent film.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 4A illustrates an aperture that includes a heater, electrical contacts, and a mounting structure, according to an example embodiment.

FIG. 4B is a side sectional side view of a laminate module mounted on and electrically connected to the aperture shown in FIG. 4A, according to an example embodiment.

FIG. 5A is a front view of a laminate structure that includes a laminate and a peeling mechanism, according to an example embodiment.

FIG. 5B is a side view of the laminate structure of FIG. 5A, according to an example embodiment.

DETAILED DESCRIPTION

Figure 1A:
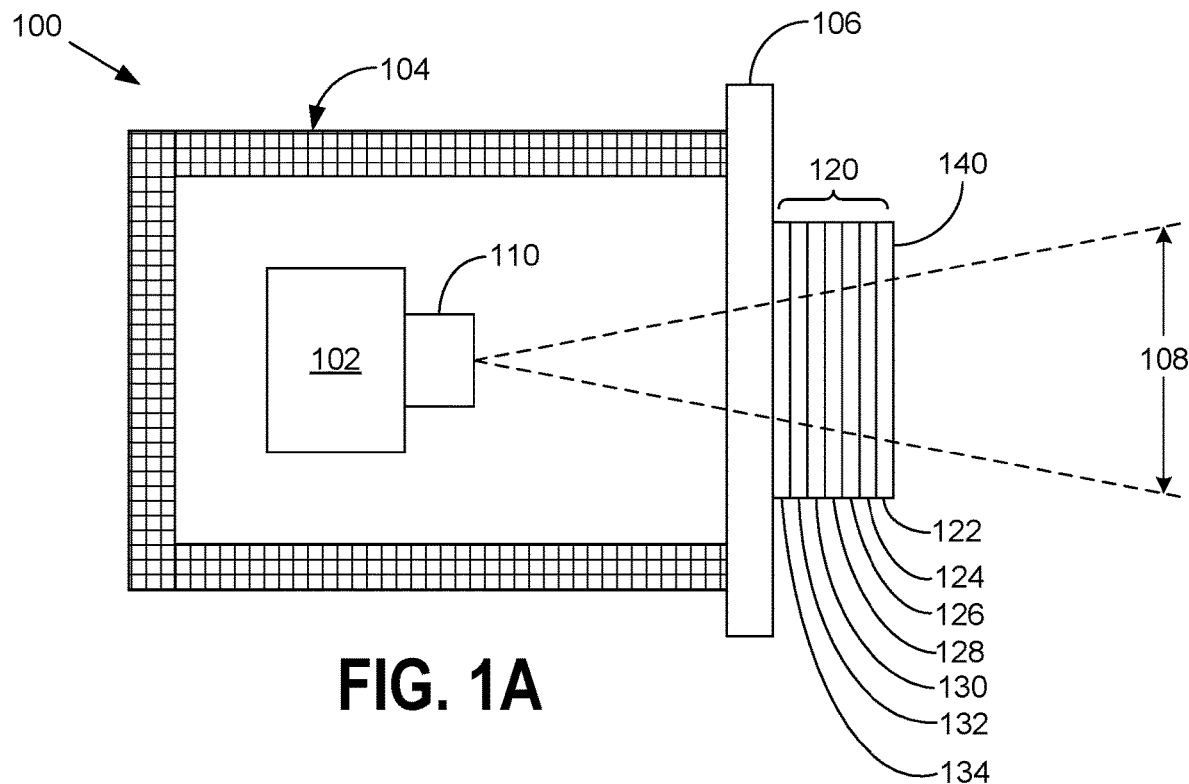
FIG. 1A is a sectional schematic illustration of an apparatus that includes an optical sensor disposed within an enclosure and a laminate comprising a plurality of transparent films that is coupled to an aperture of the enclosure within a field of view of the optical sensor, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

A sensor, such as a sensor mounted on an autonomous vehicle, may be protected from an external environment by being disposed in a sealed enclosure that keeps moisture, dirt, debris, and other contaminants from reaching the sensor. The sensor could be an optical sensor, such as a camera or a LIDAR device. Alternatively, the sensor could be a radar device, an ultrasonic sensor or some other type of sensor. The sealed enclosure may include an aperture that comprises a transparent material (such as glass or plastic) through which the sensor can observe the external environment within a field of view. The transparent material is a material that is transparent to the sensor. For example, if the sensor is configured to detect visible light, the transparent material would be transparent to visible light, whereas if the sensor is configured to detect infrared light, the transparent material would be transparent to infrared light. Over time, however, the transparent material of the aperture may become obscured by dirt, debris, or other obscuring material, or may become damaged (e.g., objects may scratch or ding the transparent material).

To protect the transparent material of the aperture from being obscured or damaged, a laminate comprising a plurality of transparent films may be coupled to the aperture. Like the transparent material of the aperture, the transparent films are transparent to the sensor (e.g., if the sensor is configured to detect visible light, the transparent films would be transparent to visible light, whereas if the sensor is configured to detect infrared light, the transparent films would be transparent to infrared light). With this arrangement, the sensor may have a field of view of the external environment through the transparent material of the aperture and the plurality of transparent films in the laminate. Each transparent film may have a hydrophobic or superhydrophobic coating to prevent the formation of water droplets that may obscure the sensor's field of view. Further, the outermost transparent film in the laminate, which is exposed to the external environment, is removable to expose an underlying transparent film in the laminate. Thus, when the outermost transparent film becomes obscured with dirt, debris, or other obscuring material, the outermost transparent film can be removed to provide a new, clean outermost transparent film, so as to maintain a clear field of view for the sensor.

The laminate could be formed by laminating together any number of transparent films to provide a total thickness of up to a few millimeters. In some examples, each transparent film could have a thickness of 30 microns up to 1 millimeter. Each transparent film could be composed of a material that is transparent to the wavelengths sensed by the sensor (e.g., visible light or infrared light). For example, the transparent films could be made of a polymeric material (such as polycarbonate or vinyl) or a ceramic material (e.g., sapphire).

The transparent films could be removably adhered together in the laminate by any suitable means of adhesion, such as, chemical adhesion (e.g., by applying an adhesive material between adjacent transparent films in the laminate), dispersive adhesion (e.g., van der Waals forces), electrostatic adhesion, and/or material diffusion between adjacent transparent films in the laminate. It is to be understood, however, that adhesive materials may reduce the clarity of the laminate. Thus, if adhesive materials are used in the laminate, it may be desirable to apply the adhesive material only along the perimeters of the transparent films, so that the sensor's field of view through the central portion of the laminate is unobscured by adhesive material.

In some implementations, the laminate may be part of a module that is removably mounted to the aperture. The module may include a laminate sensor that can detect how many transparent films remain in the laminate. The module may also include a peeling mechanism configured to remove individual transparent films. For example, the peeling mechanism can include an actuator for each transparent film in the laminate. Each actuator may include a material under spring tension that moves in a path (e.g., an arcuate path or a linear path) when released to peel off a transparent film (e.g., by interacting with a tab or other feature on the transparent film).

The laminate sensor and peeling mechanism in the module may be in communication with a controller (e.g., a controller in the autonomous vehicle). The controller may determine from the laminate sensor that the number of transparent films remaining in the laminate is sufficiently low that the laminate module should be replaced. This, in turn, may cause the autonomous vehicle to base in order to replace the laminate module. The controller may also activate the peeling mechanism to remove a transparent film. The controller may remove transparent films either periodically or in response to an indication that the sensor's field of view has become obscured. To provide for this communication with the controller, the laminate module may be electrically connected to the control system via the aperture. For example, the aperture may include a plurality of electrical contacts and the module may include a plurality of electrical conductors (e.g., flexible wires) that electrically connect to the electrical contacts when the module is mounted on the aperture.

II. EXAMPLE LAMINATE CONFIGURATION

FIG. 1A is a sectional schematic illustration of an example apparatus 100 that includes a sensor 102 disposed within a sealed enclosure 104. In this example, sensor 102 is an optical sensor, such as a camera, a photodetector, a LIDAR device, or any other device that senses light (e.g., light in visible, infrared, and/or ultraviolet wavelengths) from an external environment. It is to be understood, however, that the sensor 102 could alternatively be a radar device, ultrasonic sensor, or other type of sensor. The sealed enclosure 104 separates the optical sensor 102 from the external environment, so as to prevent rain, snow, dirt, debris, and/or other materials from the external environment from reaching the optical sensor 102. For example, the sealed enclosure 104 could be a water-tight enclosure.

As shown, the sealed enclosure 104 includes an aperture 106 that comprises a material (e.g., glass or plastic) that is transparent to the wavelengths of light sensed by the optical sensor 102 (e.g., visible light or infrared light). In this way, the optical sensor 102 is able to sense light through the transparent material of the aperture 106. More particularly, the optical sensor 102 is able to sense light from the external environment within a field of view (FOV) 108. The FOV 108 of the optical sensor 102 may be defined by an optical system 110 that is also disposed within the sealed enclosure 104 and optically coupled to the optical sensor 102. The optical system 102 could include one or more lenses, mirrors, or other optical components.

Apparatus 100 also includes a laminate 120 that is coupled to the aperture 106 outside of the sealed enclosure 104. Laminate 120 includes a plurality of transparent films laminated together. In this example, laminate 120 includes seven transparent films 122-134. It is to be understood, however, that laminate could include a greater number or a fewer number of transparent films. Each of the transparent films 122-134 may comprise a material that is transparent to the wavelengths of light sensed by the optical sensor 102 (e.g., visible light or infrared light). Example materials include polymeric materials (e.g., polycarbonate or vinyl) and ceramic materials (e.g., sapphire). Further, each of the transparent films 122-134 may be sufficiently thin such that individual transparent films can be peeled away from the laminate 120. In some examples, each of the transparent films 122-134 may have a thickness of between 30 microns and 1 millimeter.

The laminate 120 could be coupled to the aperture 106 either directly (e.g., with the innermost transparent film 134 in contact with the aperture 106) or indirectly (e.g., as described below). Either way, the laminate 120 may be coupled to the aperture 106 such that the FOV 108 of the optical sensor 102 extends through the transparent material of the aperture 106 and each of the transparent films 122-134 in the laminate 120.

The laminate 120 can protect, in various ways, the FOV 108 of the optical sensor 102 from becoming obscured over time. The protection provided by the laminate 120 is at least partially the result of the ability to remove (e.g., peel away) individual transparent films from the laminate 120. As shown in FIG. 1A, the laminate 120 has an outermost surface 140 that is exposed to the external environment. The outermost surface 140 is a surface of the outermost transparent film in the laminate 120, namely, transparent film 122. The transparent film 122 may be regarded as the exposed transparent film in the laminate 120 due to its surface 140 being exposed to the external environment. It is to be understood, however, that portions of other transparent films in the laminate 120, such as side edges of transparent films, may also be exposed to the external environment.

Figure 1B:
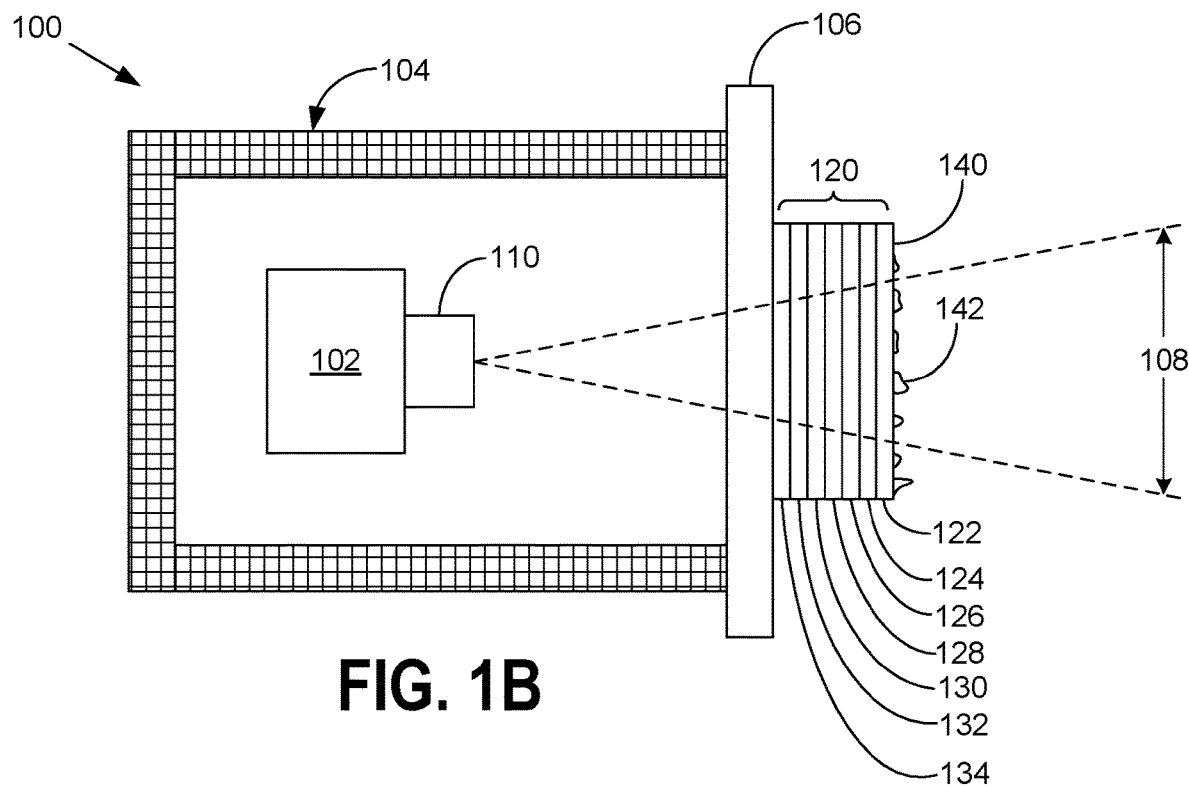
FIG. 1B is a sectional schematic illustration of the apparatus of FIG. 1A in which obscuring material has collected on an exposed transparent film in the laminate, according to an example embodiment.
Figure 1C:
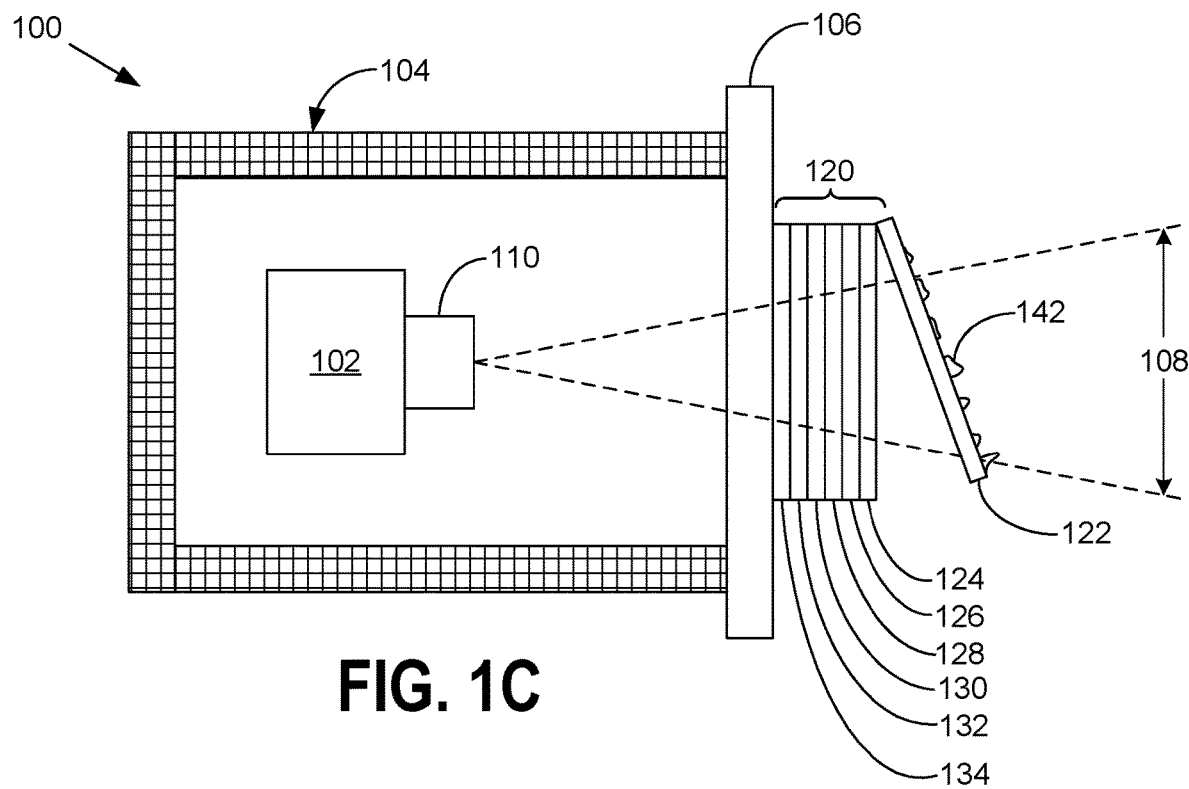
FIG. 1C is a sectional schematic illustration of the apparatus of FIG. 1B showing the exposed transparent film being peeled away, according to an example embodiment.
Figure 1D:
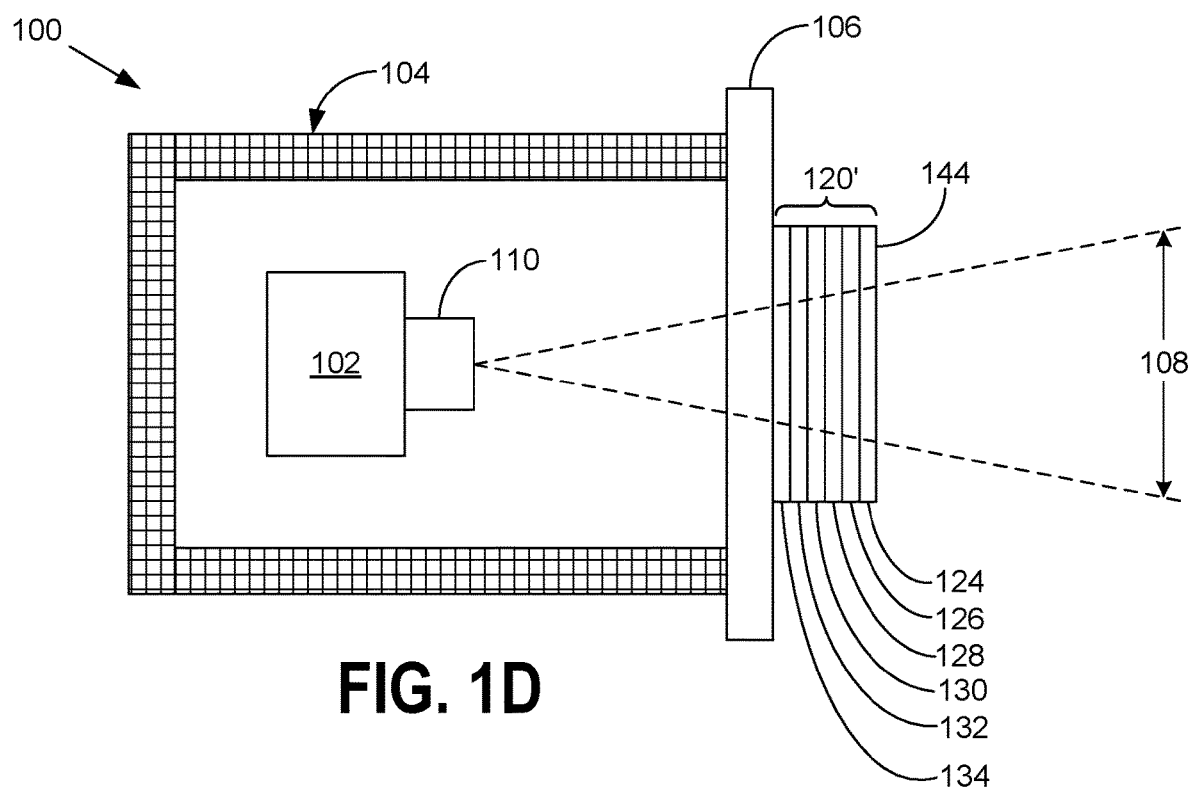
FIG. 1D is a sectional schematic illustration of the apparatus of FIG. 1C after the exposed transparent film has been peeled away to expose an underlying transparent film in the laminate, according to an example embodiment

Due to exposure to the external environment, the surface 140 may collect dirt, debris, or other obscuring materials over time. This is exemplified in FIG. 1B by particles 142 shown on surface 140. The dirt, debris, or other obscuring material on surface 140 can at least partially obscure the FOV 108 of the optical sensor 102. When this occurs, the outermost transparent film 122 can be peeled away from the laminate, as illustrated in FIG. 1C. When the transparent film 122 is peeled away, the underlying transparent film 124 is exposed. This results in a reduced-thickness laminate 120' that has a clean outermost surface 144 (i.e., a surface of transparent file 124) exposed to the environment, as shown in FIG. 1D. Thus, the FOV 108 of the optical sensor 102 is no longer obscured.

The process of peeling away the outermost transparent film (e.g., transparent film 122) from the laminate 120 could be performed by a user, or it could be performed by a peeling mechanism that is coupled to the laminate 120 (e.g., as described in detail below). Either way, the transparent films 122-134 are removably adhered together in the laminate 120 to allow individual transparent films to be peeled away. To achieve this, the transparent films 122-134 could be adhered together by means of an adhesive material (e.g., applied outside of the FOV 108 of the optical sensor 102), dispersive adhesion (e.g., van der Waals forces), electrostatic adhesion, and/or material diffusion between adjacent transparent films in the laminate.

In some implementations, each of the transparent films 122-134 may include a hydrophobic or superhydrophobic coating that repels water and/or reduces the formation of water droplets on the laminate 120, for example, from rain or other sources of moisture. Thus, surface 140 may include a hydrophobic coating on transparent film 122, and surface 144 may include a hydrophobic coating on transparent film 124. With these hydrophobic or superhydrophobic coatings, water from rain or other sources may run off the surface instead of forming droplets that may obscure the FOV 108 of the optical sensor 102.

Figure 2B:
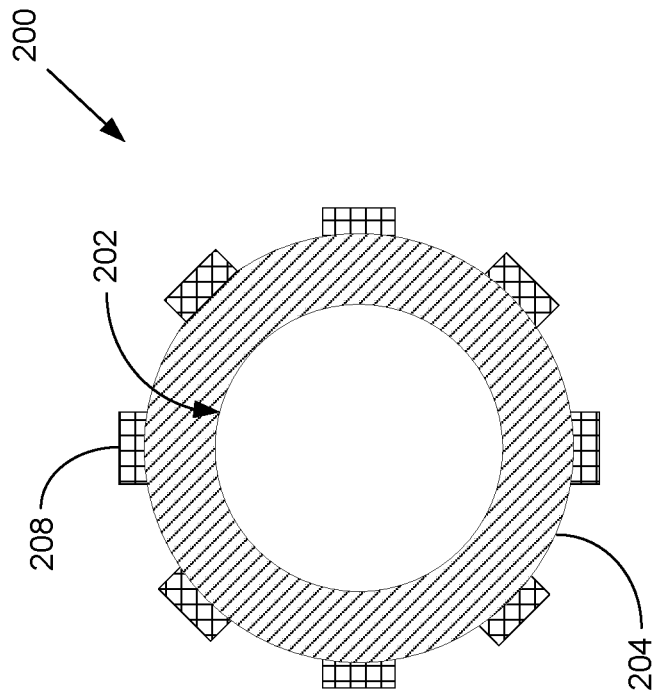
FIG. 2B is a front view of the laminate module of FIG. 2A, according to an example embodiment.
Figure 2A:
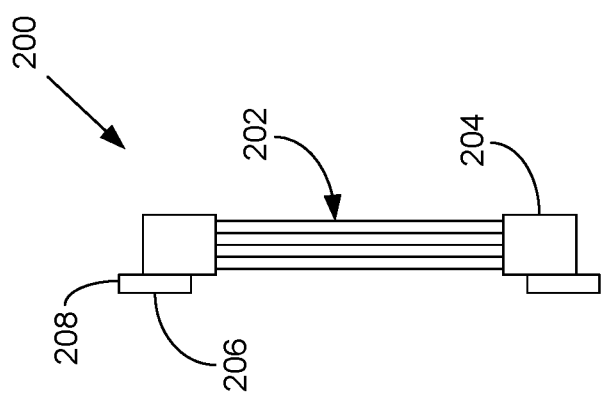
FIG. 2A is a side sectional view of a laminate module, according to an example embodiment.
Figure 3B:
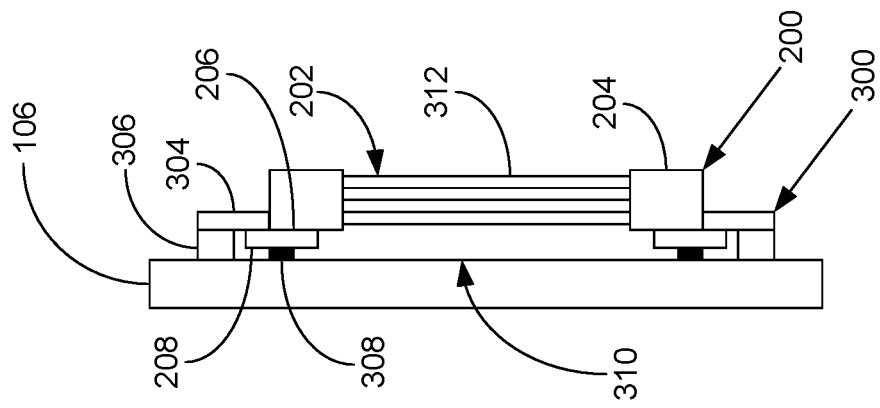
FIG. 3B is a side sectional view of the assembly shown in FIG. 3A, according to an example embodiment.
Figure 3A:
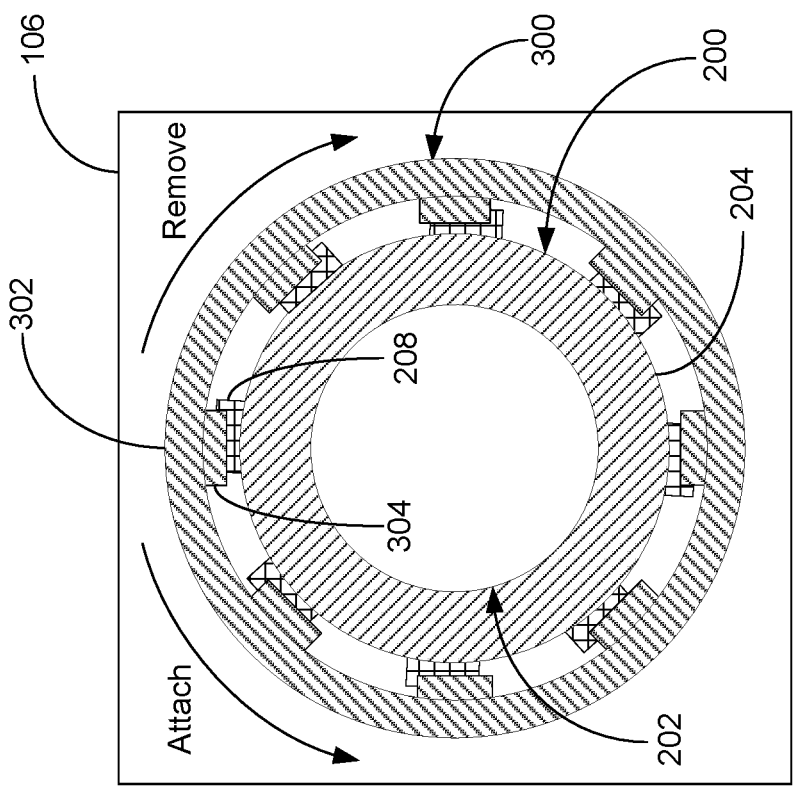
FIG. 3A is a front view of an assembly comprising the laminate module of FIG. 2A attached to a mounting structure on an aperture, according to an example embodiment.

Although FIGS. 1A-1D show an example in which the laminate is attached directly to and in contact with the aperture, in other examples, the laminate could be attached to the aperture indirectly such that the laminate is spaced apart from the aperture. This can be achieved by providing the laminate as part of a module that can be attached to a mounting structure on the aperture. FIG. 2A is a side sectional view of an example laminate module 200. FIG. 2B is a front view of the example laminate module 200. FIG. 3A is a front view of the example laminate module 200 attached to an example mounting structure 300 on aperture 106. FIG. 3B is a side sectional view of the example laminate module 200 attached to the example mounting structure 300.

With reference to FIGS. 2A and 2B, the example laminate module 200 includes a laminate 202 that includes a plurality of transparent films laminated together. Laminate 202 could be similar to laminate 120 as shown in FIGS. 1A-1C and described above. Laminate 202 is held from the sides by a holder 204. Holder 204 is mounted on a mounting ring 206 that includes a plurality of outwardly extending tabs 208. The tabs 208 are configured to interlock with corresponding tabs 304 of mounting structure 300 disposed on the aperture 106 (e.g., as shown in FIG. 3A). As described in more detail below, holder 204 may also include a sensor for sensing the number of the transparent films remaining in the laminate 202, a peeling mechanism for peeling individual transparent films from the laminate 202, and electrical connections (not shown).

As shown in FIG. 3A, the mounting structure 300 on aperture 106 includes a ring 302 with inwardly-extending tabs 304. The ring 302 may be attached to the aperture by an attachment layer 306 (e.g., double-sided tape) as shown in FIG. 3B. The laminate module 200 can be attached to the mounting structure 300 by rotating the laminate module 200 in the direction of the "Attach" arrow so that the tabs 208 of the laminate module 200 slide under the tabs 304 of the mounting structure 300. The laminate module 200 can be removed by rotating in the opposite direction, as indicated by the "Remove" arrow.

FIG. 3B shows a side sectional view of the laminate module 200 attached to the mounting structure 300 on the aperture. When the laminate module 200 is attached in this way, an O-ring 308 (or a gasket or other type of seal) is compressed between the mounting ring 206 and the aperture 106. The O-ring 308 could be, for example, disposed on the aperture 106 when the laminate module 200 is attached or held in a groove in mounting ring 206 as part of the laminate module 200.

The O-ring 308 or other seal creates a sealed environment 310 between the laminate module 200 and the aperture 106. The sealed environment 310 may prevent rain, snow, dirt, debris, other obscuring material from collecting on aperture 106 within the FOV 108 of the optical sensor 102. Instead, such materials may collect on the outermost surface of the laminate 202 (shown in FIG. 3B as surface 312). However, as surface 312 becomes obscured, the outermost transparent film of laminate 202 can be removed to reveal a clean transparent film, as described above. This process of removing transparent films from the laminate 202 that have been obscured may continue until all of the transparent films have been removed. At that point, the laminate module 200 may be replaced. Alternatively, the laminate module 200 could be proactively replaced before all of the transparent films are removed.

In some implementations, the aperture 106 may include various types of electrical components and/or connections, for example, as shown in FIG. 4A. For purposes of illustration, FIG. 4A shows mounting structure 300 on aperture 106 without laminate module 200 attached. In this example, the aperture 106 includes an integrated heater 400. The heater 400 includes a generally ring-shaped heating element 402 connected to electrical leads 404 and 406. As shown, the heating element 402 may be positioned outside of FOV 108 of optical sensor 102 but inside of tabs 304. The heating element 402 and electrical leads 404 and 406 could be disposed within the transparent material of aperture 106, or they could be disposed on the inner surface or outer surface of the aperture 106.

In the example shown in FIG. 4A, the aperture 106 also includes three electrical contacts 410, 412, and 414, with corresponding electrical leads 420, 422, and 424. The electrical contacts 410-414 and the electrical leads 420-424 can be disposed on the outward-facing surface of the aperture 106. The electrical contacts 410, 412, and 414 can be used to make electrical connections to a sensor, a peeling mechanism, and/or other electrical components in the laminate module 200. The electrical connections could be accomplished by electrical conductors 430, 432, and 434 extending from holder 204 to contact electrical contacts 410, 412, and 414, respectively. The electrical conductors 430, 432, and 434 could be, for example, wires or electrically conductive fingers with sufficient stiffness to press against electrical conductors 430, 432, and 434 and make good electrical contact when the laminate module 200 is attached to the mounting structure 300.

The electrical connections formed by the electrical conductors 430-434 in contact with the electrical contacts 410-414 can be used to provide power and ground for a sensor, a peeling mechanism, and/or other electrical components in the laminate module 200. The electrical connections could also be used for bi-directional data communication, for example, using the Local Interconnect Network (LIN) protocol. The data communication could be used by a controller to obtain state information regarding the laminate module 200, such as an indication that the laminate module 200 is electrically connected and data from the sensor that indicates how many transparent films remain in the laminate 202. The data communication could also be used by a controller to control a peeling mechanism that is configured to peel away individual transparent films from the laminate 202.

FIGS. 5A and 5B illustrates an example laminate structure 500 that includes a laminate 502 comprising a plurality of transparent films laminated together and a peeling mechanism 504 configured to peel away individual transparent films. FIG. 5A is a front view of the example laminate structure 500. FIG. 5B is a side view of the example laminate structure 500. As shown, the laminate 502 includes an exposed transparent film 506 (e.g., the outermost transparent film in the laminate 502) and three underlying transparent films. It is to be understood, however, that laminate 502 could include a greater or fewer number of transparent films. Although not shown in FIGS. 5A and 5B, the laminate structure 500 could also include a holder (e.g., like holder 204) and a mounting structure (e.g., like mounting ring 206) that enables the laminate structure 500 to be removably mounted over the aperture 106. Thus, laminate structure 500 could be similar to laminate module 200.

In this example, the peeling mechanism 504 includes a plurality of actuators, with each actuator being configured to peel away a corresponding transparent film in the laminate 502. As shown in FIGS. 5A and 5B, an actuator 510 is configured to peel away the exposed transparent film 506.

As best shown in FIG. 5A, the actuator 510 has an arcuate shape that surrounds the transparent film 506. The actuator 510 is coupled to the transparent film 506 via an engagement tab 512 that extends from the transparent film 506. In some examples, the engagement tab 512 could be integral to the transparent film 506. In some examples, the engagement tab 512 could be attached to the transparent film 506, for example, by an adhesive or some other means.

The actuator 510 could be a metal or other material that is under spring tension that tends to cause the actuator 510 to rotate about an axis 514. The direction of rotation about axis 514 is indicated by the arcuate arrow in FIG. 5B. When the actuator 510 rotates about the axis 514 in this way, the actuator 510 pulls on the transparent film 506 via the engagement tab 512 such that the transparent film 506 is peeled away from the laminate 502, thereby exposing the transparent film below it. Thus, the actuator 510 moves the transparent film 506 out of the page in the view of FIG. 5A, and moves the transparent film 506 to the right in the view of FIG. 5B.

This movement by the actuator 510 may be initiated by a controller in response to a determination that the FOV 108 of the optical sensor 102 has become obscured by the dirt, debris, or other obscuring material on the exposed transparent film 506. To initiate the movement by the actuator 510, the controller may release a retaining mechanism that holds the actuator 510 in place. For example, FIG. 5A shows actuator 510 held in place by retainers 520 and 522. To initiate the actuator 510, the controller may cause a current to flow through the retainers 520, 522. The current may cause the material of the retainers 520, 522 to melt or evaporate or otherwise alter the state of the retainers 520, 522 so as to release the actuator 510. The spring tension in the actuator 510 then causes the actuator 510 to rotate about the axis 514 to peel away the transparent film 506 as described above.

In this way, the peeling mechanism 504 can remove individual transparent films from the laminate 502 under the control of a controller. Although in this example, the peeling mechanism 504 is implemented as a plurality of actuators like actuator 510, it is to be understood that the peeling mechanism 504 could be implemented in other ways.

III. EXAMPLE CONTROL SYSTEM

Figure 6:
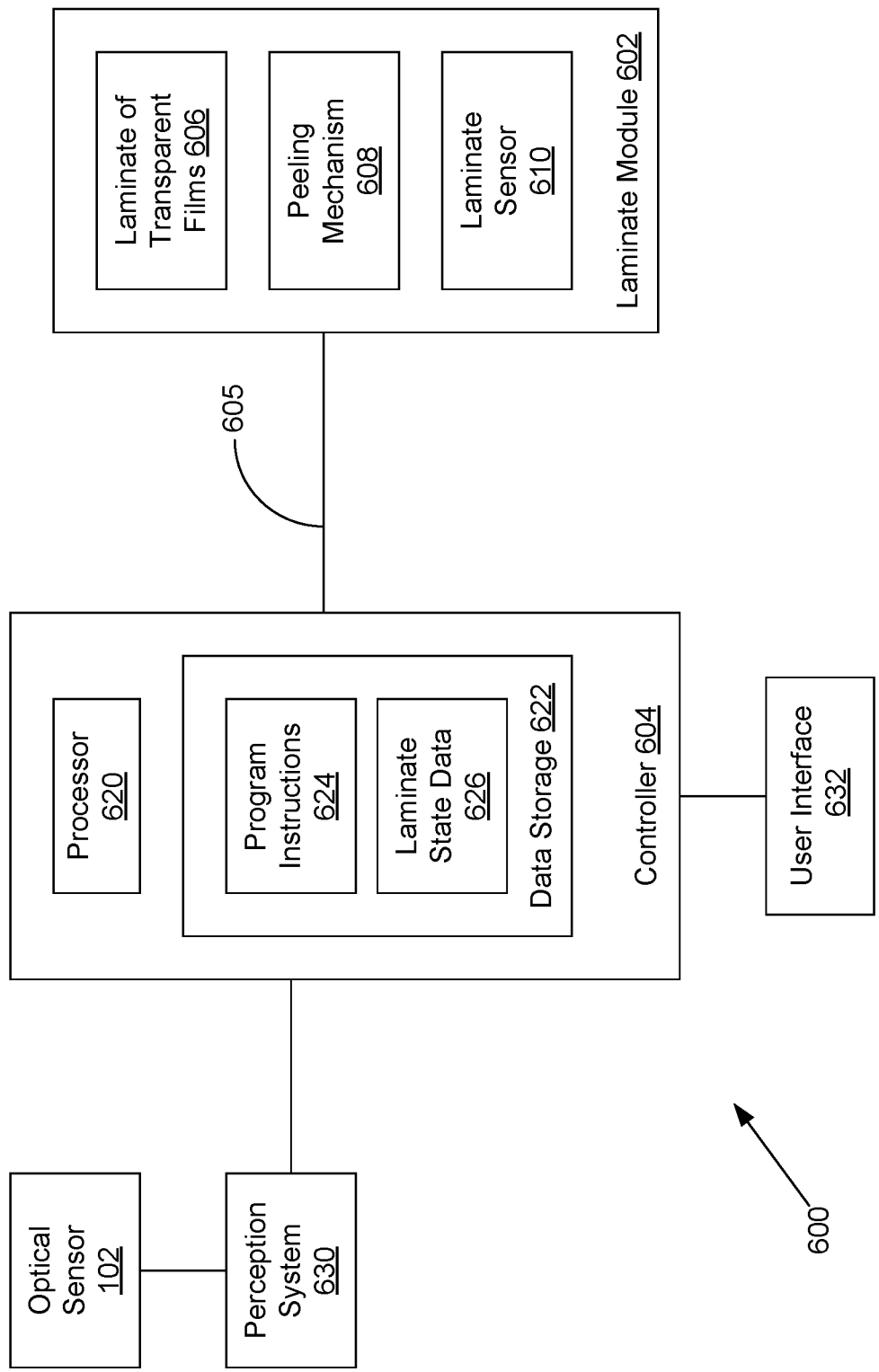
FIG. 6 is a block diagram of a control system, according to an example embodiment.
Figure 7A:
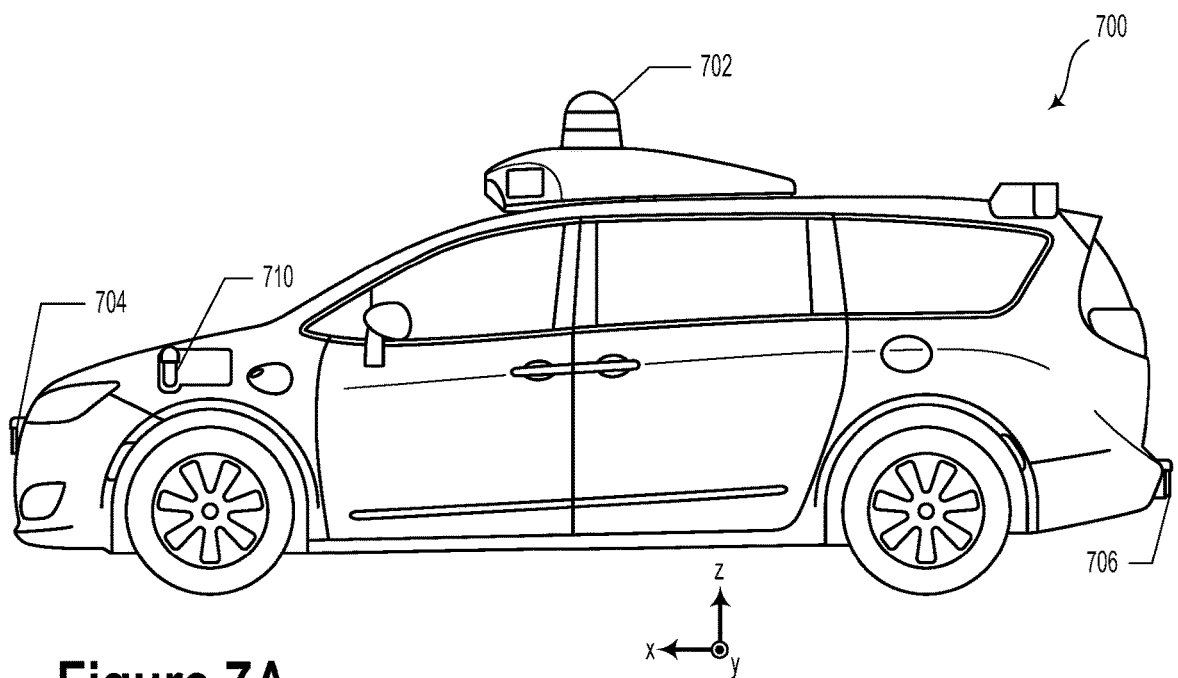
FIG. 7A illustrates a vehicle, according to an example embodiment.
Figure 7B:
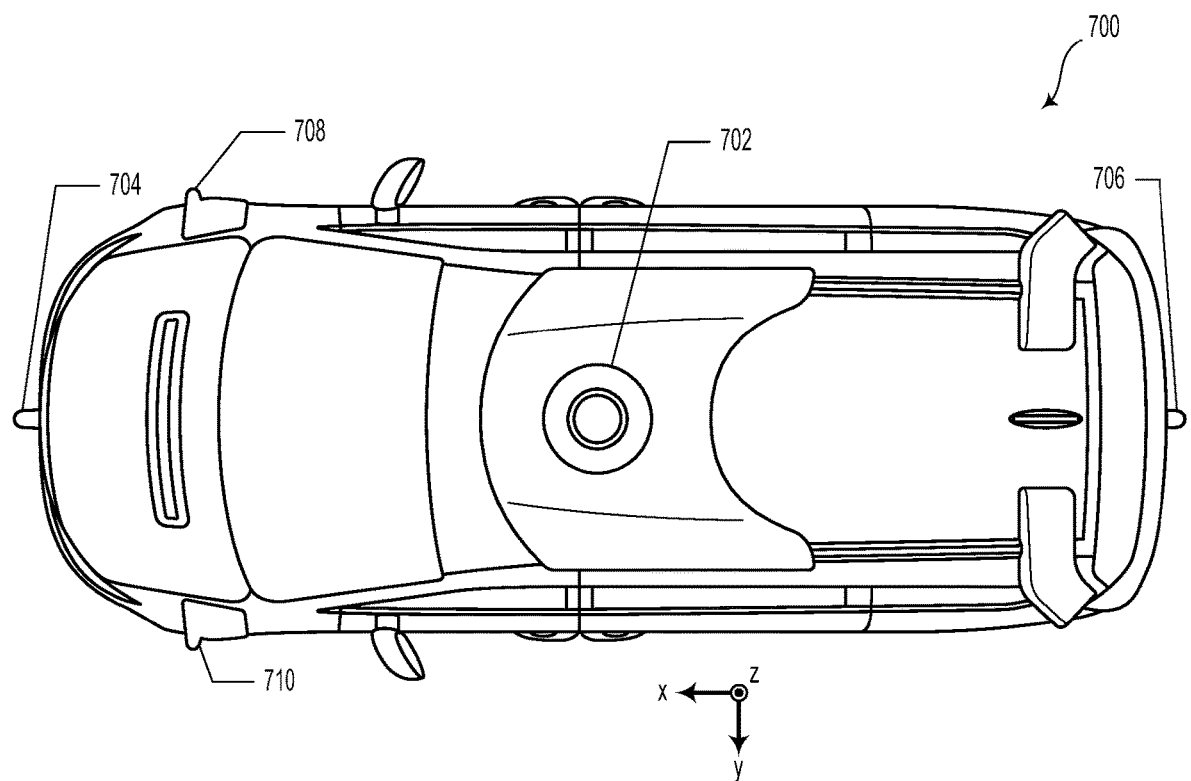
FIG. 7B illustrates a vehicle, according to an example embodiment.
Figure 7C:
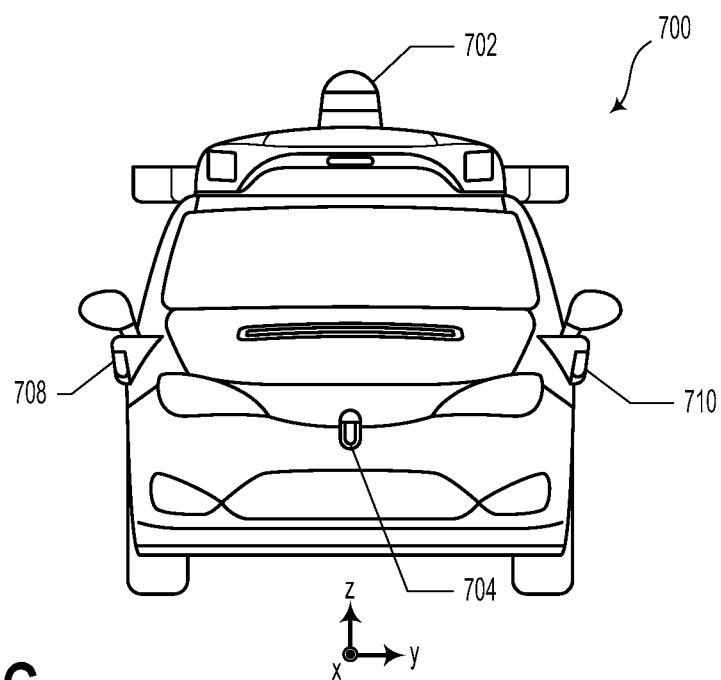
FIG. 7C illustrates a vehicle, according to an example embodiment.
Figure 7D:
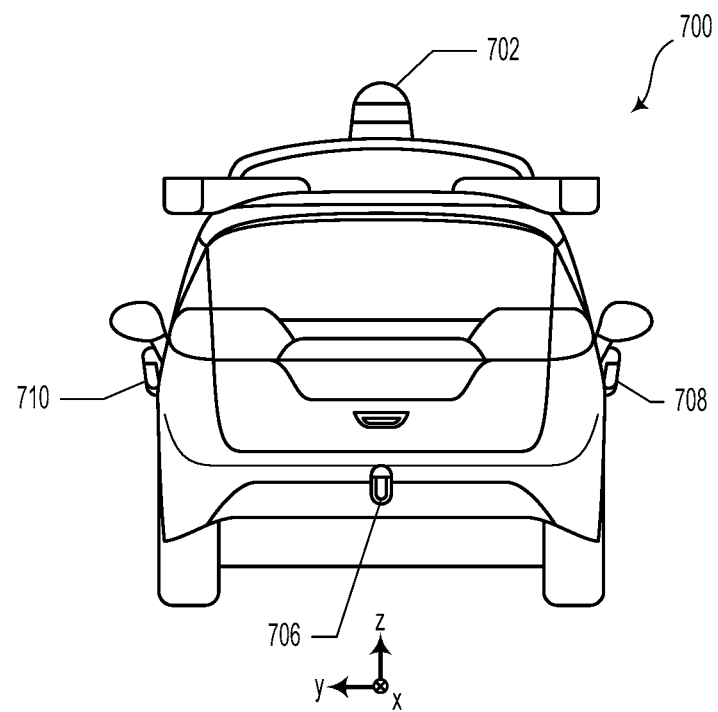
FIG. 7D illustrates a vehicle, according to an example embodiment.
Figure 7E:
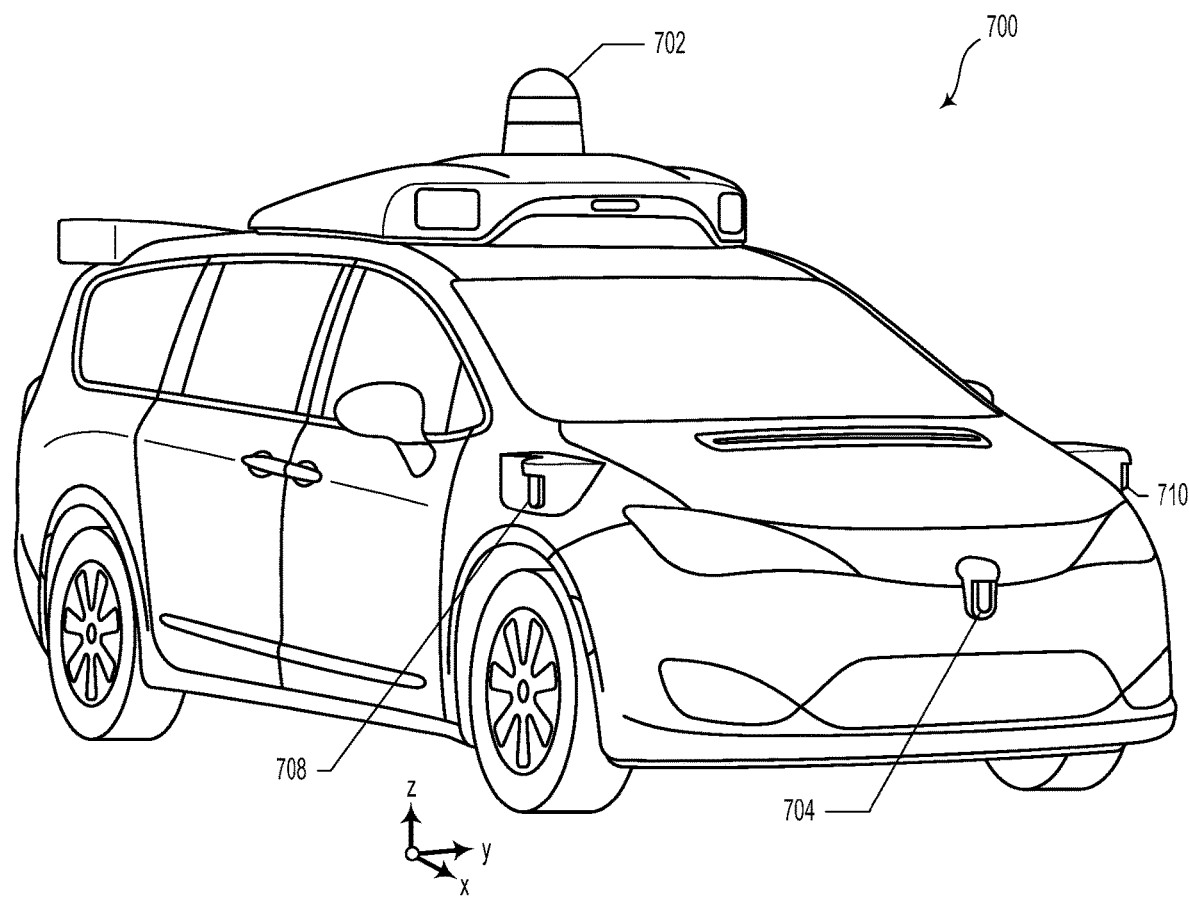
FIG. 7E illustrates a vehicle, according to an example embodiment.

FIG. 6 is a schematic diagram of an example control system 600 in which a laminate module 602 is controlled by a controller 604 via a network 605 (e.g., an in-vehicle network). The laminate module 602 could be similar to the laminate module 200 shown in FIGS. 2A, 2B, 3A, 3B, and 4B and/or similar to the laminate structure 500 shown in FIGS. 5A and 5B. In this example, the laminate module 602 includes a laminate of transparent films 606 laminated together, a peeling mechanism 608, and a laminate sensor 610.

The peeling mechanism 608 is configured to peel away individual transparent films in the laminate 606. For example, the peeling mechanism 608 could include a plurality of actuators (e.g., like actuator 510), with each actuator configured to peel away a corresponding transparent film. Each actuator in the peeling mechanism 608 could be activated by a signal transmitted by the controller 604 via the network 605. The signal may cause a retaining mechanism to release the actuator, for example, as described above for FIGS. 5A and 5B.

The laminate sensor 610 is configured to sense how many transparent films remain in the laminate 606. For example, the laminate sensor 610 could include a resistive network in which each resistor is associated with a transparent film. Thus, as the number of transparent films decreases, the resistance of the resistive network decreases. The resistance of the resistive network could be measured by electronics in the laminate sensor 610 and communicated to the controller 604 via the network 605. Alternatively, the resistance of the resistance network could be measured by the controller 604 via the network 605.

In an example embodiment, the controller 604 could be implemented as a computing device that includes a processor 620 and data storage 622. The data storage 622 may include volatile memory, non-volatile memory, disk storage, or any other type of non-transitory computer readable medium. The data storage 622 may store program instructions 624 that are executable by the processor 620 to perform any of the methods described herein.

The data storage 622 may also store other data, such as laminate state data 626. The laminate state data 626 may include any data indicative of a state of the laminate 606 and/or the laminate module 602. For example, the laminate state data 626 may indicate that the laminate module 602 is electrically connected via the network 605 based on the controller 604 sensing the laminate module 602 via the network 605. The laminate state data 626 may also include data indicative of the number of transparent films remaining in the laminate 606. The controller 604 may determine this number based on data from the laminate sensor 610, based on the number of times that the controller 604 has activated the peeling mechanism to peel away a transparent film from the laminate 606, and/or based on other data. The laminate state data 626 may also include other data that relates to the laminate 606 or the laminate module 602. For example, the laminate state data 626 may include history data that indicates when the laminate module 602 was installed, as well as the times/dates when transparent films have been removed from the laminate 606 using the peeling mechanism 608.

Controller 604 may be communicatively coupled to the optical sensor 102 (e.g., as shown in FIGS. 1A-1D), either directly or via a perception system 630. For example, in implementations in which system 600 is in a vehicle, the perception system 630 may be configured to analyze sensor data from the optical sensor 102 (e.g., image data from a camera or point cloud data from a LIDAR device) to support autonomous operation of the vehicle. As part of that analysis, the perception system 630 may be configured to determine from the sensor data when the FOV 108 of the optical sensor 102 has become obscured and responsively send a signal to the controller 604. Alternatively, perception system 630 may be a function implemented by the controller 604. Thus, the controller 604 may be able to analyze the sensor data from the optical sensor 102 to determine when the FOV 108 of the optical sensor 102 has become obscured.

Controller 604 may also be communicatively coupled to a user interface 632. The user interface 632 may include a display, speaker, indicator light, and/or other output device configured to convey information to the user. The information could include, for example, an indication to the user that the laminate module 602 should be replaced. Alternatively, when implemented in an autonomous vehicle, the information could indicate that the vehicle will return to base in order to replace the laminate module 602. The user interface 632 could convey other types of information to the user as well.

The user interface 632 may also include a touchscreen, a keypad, one or more buttons, and/or other input device configured to receive input from the user. The input from the user could be, for example, a request that the controller 604 activate the peeling mechanism 608 to remove the exposed transparent film from the laminate 606. Alternatively, the input from the user could indicate that the user has replaced the laminate module 602. The user interface 632 could receive other types of input from the user as well.

Controller 604 may be programmed by the program instructions 624 to cause peeling mechanism 608 to peel away the exposed transparent film in the laminate 606 in response to a predefined trigger. The predefined trigger may be any indication that the exposed transparent film in the laminate 606 has become obscured with dirt, debris, or other obscuring material that obscures the field of view of the optical sensor 102. In one example, the predefined trigger may be a signal that the perception system 630 sends to the controller 604 when the perception system 630 has determined, based on analysis of sensor data from the optical sensor 102, that the FOV 108 of the optical sensor 102 has become obscured. In another example, the predefined trigger could be a determination made by the controller 604, based on analysis of sensor data from the optical sensor 102, that the FOV 108 of the optical sensor 102 has become obscured. In yet other examples, the predefined trigger could be based on a signal from another sensor, based on data from another system, or based on an input received via the user interface 632.

The controller 604 may also take into account the number of transparent films remaining in the laminate 606 (e.g., as indicated by the laminate state data 626) when responding to the predefined trigger. For instance, if the controller 604 detects the predefined trigger when only one transparent film remains in the laminate 606, then the controller 604 may provide an indication that the laminate module 602 should be replaced in addition to activating the peeling mechanism 608 to peel away the last remaining transparent film. The indication could be conveyed to the user via the user interface 632. Alternatively, in an autonomous vehicle implementation, the indication could cause the vehicle to return to a specified location where the laminate module 602 can be replaced (e.g., cause the vehicle to return to base). In some implementations, the controller 604 could provide such an indication in response to detecting the predefined trigger when two, zero, or some other predetermined number of transparent films remain in the laminate 606.

The control system 600 may include other components not shown in FIG. 6. For example, the system may include a plurality of optical sensors, and the controller 604 may be configured to control, via the network, a corresponding plurality of laminate modules. Each laminate module may include a laminate of transparent films in the field of view of one of the optical sensors, along with a peeling mechanism and laminate sensor for that laminate. In some implementations, controller 604 may be configured to control a vehicle in an autonomous mode. Thus, controller 604 may be configured to plan a route for the vehicle and may be configured to control the steering and the speed of the vehicle so as to navigate along the route.

IV. EXAMPLE VEHICLES

FIGS. 7A-7E illustrate a vehicle 700, according to an example embodiment. The vehicle 700 could be a semi- or fully-autonomous vehicle. While FIGS. 7A-7E illustrates vehicle 700 as being an automobile (e.g., a van), it will be understood that vehicle 700 could include another type of autonomous vehicle, robot, or drone that can navigate within its environment using sensors and other information about its environment.

The vehicle 700 may include one or more sensor systems 702, 704, 706, 708, and 710. In example embodiments, sensor systems 702, 704, 706, 708, and 710 each include a respective LIDAR device. In addition, one or more of sensor systems 702, 704, 706, 708, and 710 could include radar devices, cameras, or other sensors.

The LIDAR devices of sensor systems 702, 704, 706, 708, and 710 may be configured to rotate about an axis (e.g., the z-axis shown in FIGS. 7A-7E) so as to illuminate at least a portion of an environment around the vehicle 700 with light pulses and detect reflected light pulses. Based on the detection of reflected light pulses, information about the environment may be determined. The information determined from the reflected light pulses may be indicative of distances and directions to one or more objects in the environment around the vehicle 700. For example, the information may be used to generate point cloud information that relates to physical objects in the environment of the vehicle 700. The information could also be used to determine the reflectivities of objects in the environment, the material composition of objects in the environment, or other information regarding the environment of the vehicle 700.

The information obtained from one or more of systems 702, 704, 706, 708, and 710 could be used to control the vehicle 700, such as when the vehicle 700 is operating in an autonomous or semi-autonomous mode. For example, the information could be used to determine a route (or adjust an existing route), speed, acceleration, vehicle orientation, braking maneuver, or other driving behavior or operation of the vehicle 700.

In example embodiments, one or more of systems 702, 704, 706, 708, and 710 could include a sensor (e.g., a camera, a LIDAR device, radar device, or ultrasonic sensor) with a laminate of transparent films in the field of view of the sensor, for example, as illustrated in FIGS. 1A-5B and described above. In addition, the control system 600 illustrated in FIG. 6 and described above could be implemented in vehicle 700. In embodiments in which the vehicle 700 is a semi- or fully-autonomous vehicle, controller 604 may be configured to operate the vehicle in an autonomous or semi-autonomous mode.

V. EXAMPLE METHODS

Figure 8:
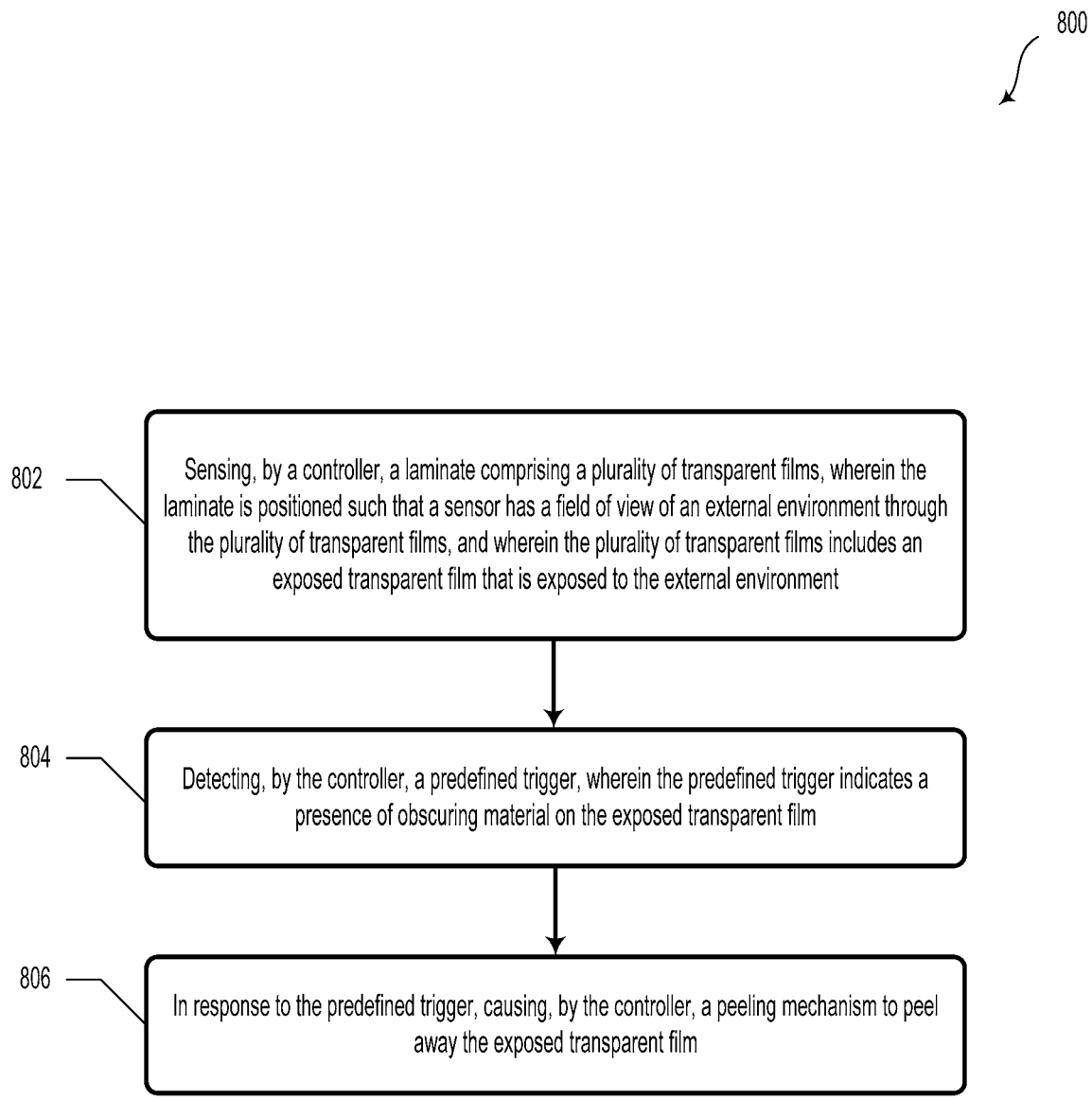
FIG. 8 is a flowchart of a method, according to an example embodiment.

FIG. 8 is a flow chart of an example method 800. This example method 800 describes operations that may be performed by a controller, such as controller 604 in control system 600 shown in FIG. 6 and described above. It is to be understood, however, that the controller in example method 800 could be implemented in other ways.

The example method 800 involves sensing, by a controller, a laminate comprising a plurality of transparent films, as indicated by block 802. The laminate could be similar to laminate 120, laminate 202, laminate 502, or laminate 606. Thus, the laminate may be positioned relative to a sensor (e.g., optically coupled to optical sensor 102) such that the sensor has a field of view of an external environment through the plurality transparent films. The plurality of transparent films includes an exposed transparent film (e.g., an outermost transparent film in the laminate) that is exposed to the external environment. Thus, the exposed transparent film may become obscured by dirt, debris, or other obscuring material from the external environment.

In some examples, the controller may sense the laminate by sensing that a laminate module that includes the laminate is electrically connected to the controller or other component. For example, with reference to FIG. 6, the controller 604 may detect that laminate module 602 is electrically connected to the network 605.

In some examples, sensing the laminate may include sensing, by the controller, a number of transparent films remaining in the laminate, for example, using a sensor such as laminate sensor 610.

The example method 800 further involves detecting, by the controller, a predefined trigger, wherein the predefined trigger indicates a presence of obscuring material on the exposed transparent film, as indicated by block 804. In some examples, the controller may detect the predefined trigger based on analysis by the controller of sensor data from the optical sensor 102. In other examples, the controller may detect the predefined trigger based on a signal from a perception system that analyzes the sensor data from the optical sensor 102, based on input from a user interface, or based on some other type of signal or indication.

The example method 800 further involves, in response to the predefined trigger, causing, by the controller, a peeling mechanism to peel away the exposed transparent film, as indicated by block 806. The peeling mechanism could be similar to peeling mechanism 504 or peeling mechanism 608.

In some embodiments, method 800 could further involve determining, by the controller, that the number of transparent films remaining in the laminate has reached a predetermined number, such as zero, one, or two remaining transparent films. In response to this determination, the controller may provide an indication that the laminate (or laminate module) should be replaced. In some embodiments, the controller may provide the indication via a user interface so that the user can have the laminate or laminate module replaced. Alternatively, in embodiments in which the controller is in an autonomous vehicle, the indication may cause the autonomous vehicle to return to base for the replacement.

VI. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method, comprising:
    analyzing sensor data from a sensor coupled to a vehicle, wherein the sensor is separated from an external environment by an aperture comprising a transparent material and by at least one transparent film such that the sensor has a field of view of the external environment through the transparent material of the aperture and the at least one transparent film, wherein the at least one transparent film includes an exposed transparent film that is exposed to the external environment, and wherein the exposed transparent film is removable;
    determining, by a controller and based on the analysis of the sensor data, that the field of view of the sensor has become obscured; and
    responsive to determining that the field of view of the sensor has become obscured, sending, by the controller, a signal indicating that the exposed transparent film should be removed and causing, by the controller, the vehicle to return to a specified location.

2. The method of claim 1, wherein sending, by the controller, the signal indicating that the exposed transparent film should be removed comprises:
    sending, by the controller, the signal to a peeling mechanism, wherein the signal causes the peeling mechanism to remove the exposed transparent film.

3. The method of claim 1, sending, by the controller, the signal indicating that the exposed transparent film should be removed comprises:
    conveying, by the controller, information to a user via a user interface, wherein the information indicates that the user should remove the exposed transparent film.

4. The method of claim 1, wherein the sensor comprises a camera.

5. The method of claim 1, wherein the sensor comprises a light detection and ranging (LIDAR) device.

6. The method of claim 1, wherein the at least one transparent film is in a module that is removably mounted to the aperture.

7. The method of claim 6, further comprising:
    providing, by the controller, an indication to a user via a user interface that the module should be replaced.

8. The method of claim 6, wherein the controller is communicatively coupled to the module via a network.

9. A system, comprising:
    an aperture comprising a transparent material;
    at least one transparent film;
    a sensor coupled to a vehicle, wherein the sensor has a field of view of an external environment through the transparent material of the aperture and the at least one transparent film, wherein the at least one transparent film includes an exposed transparent film that is exposed to the external environment, and wherein the exposed transparent film is removable;
    a controller, wherein the controller comprises a processor and data storage, wherein the data storage stores program instructions that are executable by the process to perform operations comprising:
        determining, based on analysis of sensor data from the sensor, that the field of view of the sensor has become obscured;
        responsive to determining that the field of view of the sensor has become obscured, sending a signal indicating that the exposed transparent film should be removed; and
        responsive to determining that the field of view of the sensor has become obscured, causing the vehicle to return to a specified location.

10. The system of claim 9, wherein sending the signal indicating that the exposed transparent film should be removed comprises:
    sending the signal to a peeling mechanism, wherein the signal causes the peeling mechanism to remove the exposed transparent film.

11. The system of claim 9, wherein sending the signal indicating that the exposed transparent film should be removed comprises:
    conveying information to a user via a user interface, wherein the information indicates that the user should remove the exposed transparent film.

12. The method of claim 1, wherein the at least one transparent film is part of a laminate comprising a plurality of transparent films.

13. The system of claim 9, wherein the sensor comprises a camera.

14. The system of claim 9, wherein the sensor comprises a light detection and ranging (LIDAR) device.

15. The system of claim 9, wherein the at least one transparent film is in a module that is removably mounted to the aperture.

16. The system of claim 15, further comprising:
   providing an indication to a user via a user interface that the module should be replaced.

17. The system of claim 15, wherein the controller is communicatively coupled to the module via a network.

18. A non-transitory computer readable medium, wherein the non-transitory computer readable medium stores instructions that are executable by a processor to perform operations comprising:
   analyzing sensor data from a sensor coupled to a vehicle, wherein the sensor is separated from an external environment by an aperture comprising a transparent material and by at least one transparent film such that the sensor has a field of view of the external environment through the transparent material of the aperture and the at least one transparent film, wherein the at least one transparent film includes an exposed transparent film that is exposed to the external environment, and wherein the exposed transparent film is removable;
   determining, based on the analysis of the sensor data, that the field of view of the sensor has become obscured; and
   responsive to determining that the field of view of the sensor has become obscured, sending a signal indicating that the exposed transparent film should be removed and causing the vehicle to return to a specified location.

19. The non-transitory computer readable medium of claim 18, sending the signal indicating that the exposed transparent film should be removed comprises:
   sending the signal to a peeling mechanism, wherein the signal causes the peeling mechanism to remove the exposed transparent film.

20. The method of claim 9, wherein the at least one transparent film is part of a laminate comprising a plurality of transparent films.

* * * * *